(12) United States Patent
Bryant

(10) Patent No.: US 6,295,512 B1
(45) Date of Patent: Sep. 25, 2001

(54) SUBSURFACE MAPPING APPARATUS AND METHOD

(76) Inventor: John Bryant, 4393 Westgrove, Dallas, Dallas, TX (US) 75248

( * ) Notice: Subject to any disclaimer, the term of this patent is extended or adjusted under 35 U.S.C. 154(b) by 0 days.

(21) Appl. No.: 09/071,577

(22) Filed: May 1, 1998

(51) Int. Cl.[7] ....................................................... G01V 3/02
(52) U.S. Cl. ........................... 702/189; 324/357; 324/368
(58) Field of Search .................................... 324/557, 357, 324/368, 355, 354; 702/189

(56) References Cited

U.S. PATENT DOCUMENTS

| | | | |
|---|---|---|---|
| 4,166,244 | 8/1979 | Woods et al. | 324/65 R |
| 4,801,865 | 1/1989 | Miller et al. | 324/65 R |
| 5,138,269 | 8/1992 | Deutsch | 324/715 |
| 5,346,307 | 9/1994 | Ramirez et al. | 374/136 |
| 5,357,202 | 10/1994 | Henderson | 324/557 |
| 5,537,045 | 7/1996 | Henderson | 324/557 |
| 5,661,406 | 8/1997 | Daily et al. | 324/713 |
| 5,914,603 | * 6/1999 | Daily et al. | 324/357 |

* cited by examiner

Primary Examiner—Kamini Shah
(74) Attorney, Agent, or Firm—George R. Schultz

(57) ABSTRACT

A method is provided for detecting and locating anomalies in soil subjacent to an existing structure. Electrodes are placed into the soil both outside the structure and through the structure's foundation. Electrical resistivity data is collected using these electrodes. This electrical resistivity data is analyzed to create an electrical resistivity map or model. Inspection of the map or model can allow the operator to detect and locate resistivity anomalies which may correspond to geological anomalies in the soil. In alternative embodiment, one or more soil samples are taken from the soil adjacent to the existing structure. Laboratory resistivity measurements are performed on the soil samples to provide a set of baseline resistivity data. A resistivity map or model is produced as described above. This resistivity map or model is compared to the baseline values provided by the laboratory resistivity measurements of the soil samples to detect and locate resistivity and geological anomalies. Moreover, comparison of the resistivity model with the actual soil sample resistivity baseline allows the operator to more accurately detect subsurface anomalies by minimizing the problem of non-uniqueness and allowing the operator to disregard outlying data.

49 Claims, 5 Drawing Sheets

WENNER ARRANGEMENT

SCHLUMBERGER ARRANGEMENT

DIPOLE-DIPOLE ARRANGEMENT

SUBSURFACE MAPPING APPARATUS AND METHOD

TECHNICAL FIELD OF THE INVENTION

This invention relates to a method for producing a subsurface electrical resistivity map. More specifically, this invention relates to a method and apparatus for resistivity imaging for locating anomalies, such as groundwater, leaks, tree roots, and other vegetation, beneath and around existing structures. A regression correlation is performed on the raw resistivity data to create a resistivity model, which is converted to graphical form, then analyzed to detect and locate subsurface soil anomalies. In an alternative embodiment, the resistivity model is compared to resistivity data from soil samples taken from around the building to determine the existence and extent of subsurface anomalies.

BACKGROUND OF THE INVENTION

Detecting and locating fluid leaks beneath slab-on-grade foundations is often a difficult and destructive task. Because the slab blocks access to the soil underneath, one must either break up the slab to inspect the subjacent soil or drill relatively large holes through the slab to bore soil samples. Further, these methods require a certain amount of guesswork because of the uncertain location of suspected leaks. Consequently, a number of holes must be drilled or even jack hammered through the slab before the actual leak is located.

A less destructive method of detecting and locating leaks beneath slab foundations involves directing a radar signal down through the slab and into the subjacent soil. Because the radar return from wet soil will differ from that of dry soil, using radar may allow one to approximate a leak location without partially destroying the slab. However, certain types of reinforced slab foundations may attenuate the radar signal sufficiently such that an accurate return from the subjacent soil is unobtainable. Moreover, radar is not well suited to detecting small leaks, nor for differentiating between small leaks and variations in soil composition or the presence of roots and other plant matter.

Methods currently exist for detecting and locating leaks from landfills, hazardous waste dumps, impoundments, and other outdoor fluid containment areas by measuring changes in the conductivity and/or resistivity of the adjacent soil. Daily et al. '406 discloses mise-a-la-masse and electrical resistance tomography leak location methods. Mise-a-la-masse involves driving an electrode within a fluid containment facility to an electrical potential with respect to another electrode placed at a distance from the facility. Voltage differences are then measured between various combinations of additional electrodes placed in the soil adjacent to the facility. The leak location is located by determining the coordinates of a current source pole that best fits the measured potentials within the constraints of the known or assumed resistivity distribution. Because the potentially leaking fluid must be driven to a potential, mise-a-la-masse methods can monitor for leaks in continuous fluid systems only, such as ponds, lined fluid containment areas, and tanks.

Electrical resistivity tomography (ERT) involves placing electrodes around the periphery of, beneath, or, in the case of subsurface containment vessels, above the facility. A known current is applied to alternating pairs of electrodes, then the electrical potential is measured across other alternating pairs of electrodes. From this data the electrical resistivity at a plurality of points in the soil can be calculated. Disturbances in resistivity will correlate with migration of leaking fluid. However, Daily does not disclose a method or apparatus that allows the electrodes to be placed directly under the leak source, after construction of a building or other structure.

Henderson '202 and '045 both disclose directly monitoring the soil subjacent to a fluid containment area by burying electrodes directly beneath the containment. Both Henderson patents disclose a plurality of four-plate electrode systems. A voltage and a known current are applied across the outer pair of plates. The resulting potential difference is measured across the inner pair. Henderson '045 also discloses a system of individual electrodes that, by varying the spacing between the electrodes impressing a current into the ground and the spacing of the potential measurement electrodes, can indirectly measure the resistivity at a calculated depth. However, Henderson '045 does not disclose a method of directly monitoring the subgrade beneath a structure without permanently burying the electrodes or a method to place electrodes beneath an existing structure.

Woods et. al '244 discloses a leak detection system for radioactive waste storage tanks. The system comprises a metal tank, an AC generator connected between the tank and a reference electrode, and a plurality of reference electrodes. When the generator is energized, it creates an electric field in the ground between the tank and the reference electrode. A voltmeter measures the potential difference between the sensing electrodes and the tank. A significant change in the potential at one or more of the sensing electrodes indicates that the tank has developed a leak. Woods et al. has a number of disadvantages. First, it requires an electrically conductive fluid container. Second, it requires that the electrodes be permanently buried in the soil surrounding the tank. Finally, it requires the use of an AC generator, which is less convenient than a DC power source.

None of the prior art is entirely satisfactory to locate fluid leaks beneath an existing slab foundation. For instance, it is not practical to electrify the potentially leaking fluid—typically a plumbing system—and because there may exist multiple sources of fluid, mise-a-la-masse is not a practical option. Nor is it practical to embed permanently a series of electrodes beneath the slab to monitor soil resistivity. Further, because some of the ERT methods—for example, the Henderson references—use multiple-plate electrodes, a large hole would have to be bored into the slab to insert the electrodes into the subjacent soil making the method impractical and destructive. In addition, placing the electrodes around the periphery of the foundation is less accurate compared to placing the electrodes directly beneath the potential leak source. All the prior art electrical mapping methods only map a two-dimensional area, assuming resistivity to be uniform with depth, rather than a three-dimensional volume. Also, all the prior art methods are static. That is, once in place, none of the electrodes are moved to generate different or three-dimensional data.

Another potential problem with using existing electrical mapping methods such as ERT to locate leaks beneath a slab foundation is "non-uniqueness." Non-uniqueness is an ambiguity that arises in data. For instance, a large resistivity anomaly at a large distance from an electrode may generate the same data as a smaller anomaly located close to the electrode. This ambiguity, or non-uniqueness, may mischaracterize the actual subsurface resistivity profile, resulting in a resistivity map that indicates leaks or other resistivity anomalies in incorrect locations.

Accordingly, a need exists for a method for locating fluid leaks and other anomalies beneath slab-on-grade foundations without the need for destroying the slab or permanently burying electrodes beneath the slab. Another need exists for access to the soil beneath the slab as unobtrusively as possible. Further, a need exists for an electrical resistivity mapping method and apparatus for detecting leaks beneath a slab foundation without requiring the electrification of the fluid source. Additionally, a need exists for a method and apparatus to map a three-dimensional subjacent volume's electrical resistivity with both static and dynamic electrodes. Finally, there is a need for a method and apparatus to minimize or eliminate the errors associated with "non-uniqueness."

SUMMARY OF THE INVENTION

The present invention discloses a method and apparatus for creating an electrical resistivity map of the volume beneath a slab foundation or other structure. The method includes placing electrodes through a foundation under a structure, and applying a current through them in a specific way. In a second embodiment, the electrode positions are charged vertically to arrive at three-dimensional data. Core samples are taken from an area around the structure and tested for resistivity at varying depths. Because the present invention utilizes soil samples taken adjacent to the structure, as well as advanced geostatistical mathematical modeling techniques, the present invention will allows creation of more accurate resistivity models than those methods disclosed in the prior art. Furthermore, the disclosed electrical resistivity models will allow the user to determine the extent of vegetation and tree root penetration, differences in geology, as well as the existence, extent and location of fluid leaks.

Soil, rocks, and vegetative matter can conduct electricity to varying degrees. The resistance, or resistivity, of these materials to an electrical current will vary depending upon density, particle composition, moisture content, and the chemical composition of fluid in the spaces between the particles. A fluid leak from, for example, pipes in a slab foundation into the subjacent soil will affect the electrical resistivity (electrical resistance offered by a material to the flow of current, times the cross-sectional area of current flow and per length of current path). Liquid leaking from the pipes, through the slab, and into the subjacent soil will soak the soil. Water decreases the resistivity of the subgrade. Measuring soil resistivity at varying depths and at varying locations, both beneath and adjacent to a slab foundation, and comparing these resistivities to one another, allows one the location of soil anomalies based on resistivity variations. These anomalies can include, of course, wet soil, as from a leak. Other anomalies include tree root growth, other vegetative matter, as well as voids or spaces in the soil beneath the foundation. The location of resistivity anomalies will correspond to the location of subgrade soil anomalies.

Resistivity cannot be measured directly; however, resistivity can be computed if the intensity of a current injected into the ground, and the resulting potential difference established between measurement electrodes are measured. These quantities depend on the geometry of the electric field, the nature of the soil and interstitial fluid, and the method used to measure the injected current and the resulting potential difference.

The present invention contemplates converting the measured potential to a resistivity value, assigning the resistivity value to a spatial coordinate, and storing these values in a computer file. A computer program then performs a least squares data inversion analysis on the resistivity and location values, creating a first electrical resistivity model that minimizes the error of the field data. Next, another computer program performs a spatial data analysis, or geostatistical analysis, using kriging or other methods. Geostatistics is a branch of applied statistics that focuses on the mathematical description and analysis of geological observations. Kriging is a geostatistical method of evaluating, for example, mine reserves based on a mathematical function known as a semivariogram, or a function used to quantify the dissimilarity between groups of values. This geostatistical analysis produces a second electrical resistivity model that minimizes the error of the spatial variability of the measured resistivities. This second electrical resistivity model is then analyzed alone or compared to laboratory resistivity measurements performed on soil samples taken from around the structure. This comparison provides a standard or control for the resistivity models so that problems of non-uniqueness are minimized.

Thus, a method is provided by which anomalies such as fluid leaks can be detected beneath a slab on grade foundation by monitoring the resistivity of the subjacent soil. The apparatus includes an array of electrodes that are used to inject a known current into the soil and measure the resulting electrical potential. Typically, a pair of electrodes are used as current injecting electrodes, and another pair are used as potential measurement electrodes. When a leak occurs, the resistivity of the soil will typically decrease (or may increase depending on the conductivity of the fluid) such that the operator will detect and locate a leak.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1A:
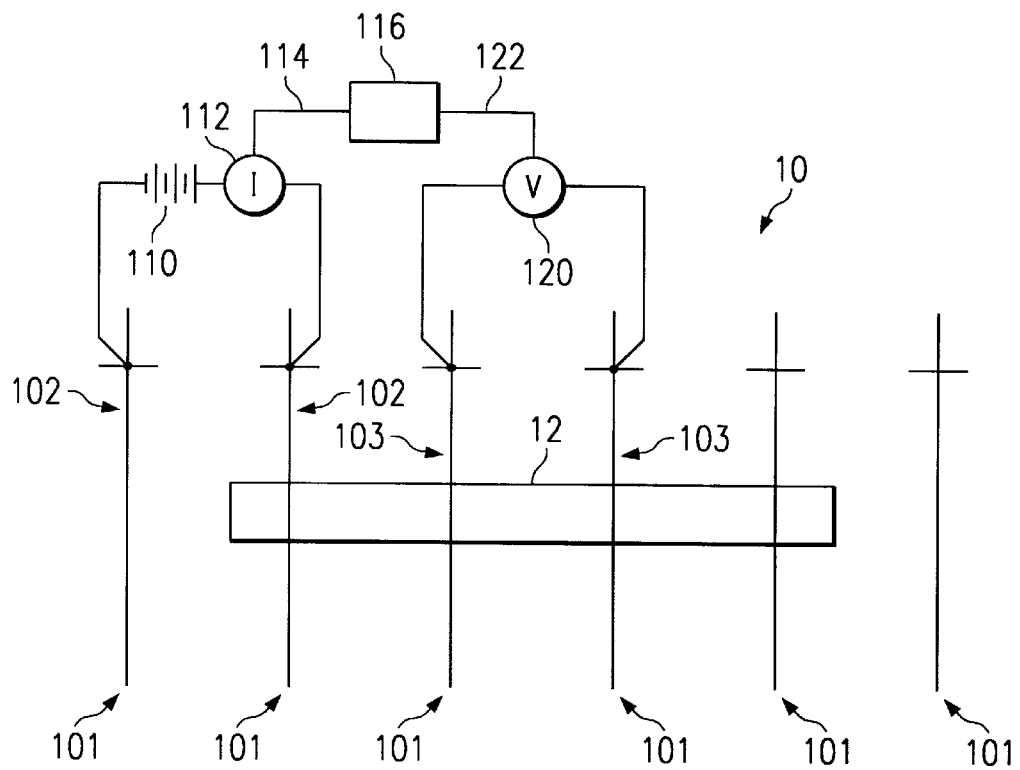
FIGS. 1a and 1b are schematic diagrams illustrating the present invention.

The present invention uses a system of electrical probes in conjunction with voltage and current measuring devices to produce data from which electrical resistivity calculations can be made. The resulting resistivity data is then processed using standard statistical and geostatistical analytical techniques to produce a resistivity map, or model, of the subgrade beneath a slab foundation.

A schematic diagram of the equipment used in the claimed method is shown in FIG. 1. A series of electrodes 101 are inserted, typically in a line, into the ground 10 both outside and through the slab foundation 12. The locations of electrodes 101 are known. Small diameter holes are drilled through foundation 12 to allow insertion of electrodes 101 through the foundation.

A first pair of electrodes 101 are connected to a D.C. or low frequency A.C. power source 110. This first pair of electrodes is referred to as current electrodes 102. Power source 110 impresses a current into the ground through current electrodes 102. In series with current electrodes 102 and power source 110 is an ammeter 112. Ammeter 112 measures the current injected into the ground by power source 110. A communication means 114 is provided to send the current measurement output of ammeter 112 to a processor 116. Processor 116 is typically a Pentium-based personal computer connected to appropriate analog to digital converters, all well known in the art.

A second pair of electrodes, potential electrodes 103, are connected with volt meter 120 in series between them. Volt meter 120 measures the potential difference across voltage electrodes 103 created by the current impressed into the ground by power source 110 through current electrodes 102. A communication means 122 passes the measured potential difference data to processor 116 via analog to digital converters.

Figure 1B:
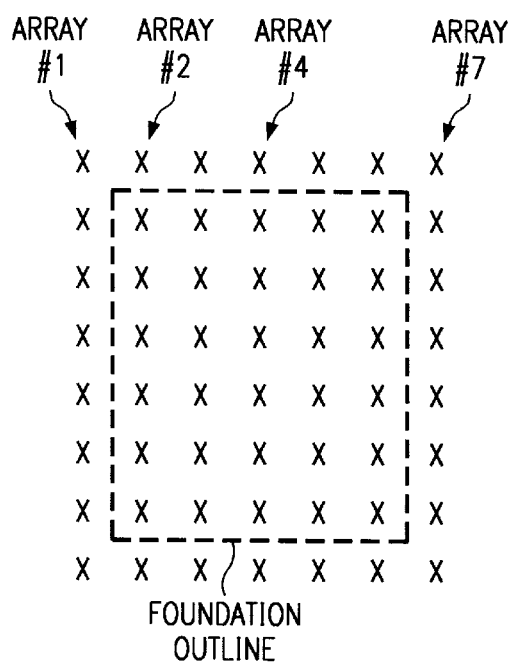
Figure 2A:
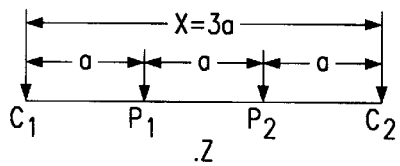
FIGS. 2a, 2b and 2c are schematic diagrams illustrating three common electrode arrangements.
Figure 2B:
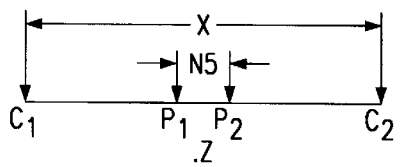
Figure 2C:
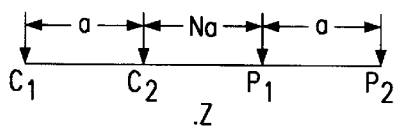

The electrodes are arranged in a plan view and may be arranged in any fashion. However, typically the electrodes are arranged in a straight line, including electrodes placed through small holes drilled directly through the foundation, as well as electrodes placed into the ground on both sides of the structure, as shown in FIGS. 1a and 1b. Typically, the electrodes are spaced in one of three patterns commonly known in the art: a Wenner arrangement, a Schlumberger arrangement, or a dipole-dipole arrangement. FIG. 2 illustrates these three spacing arrangements. In FIG. 2, "C1" and "C2" represent the current electrodes, while P1 and P2 represent the potential electrodes. "X" and "a" represent array length and electrode spacing dimensions, respectively. "Z" represents a "virtual point" in the subgrade that corresponds to the calculated resistivity value. The operator can calculate the depth for Z for a given measured potential difference depending on the type of spacing arrangement used and the lengths involved. The formulae for calculating depth Z are commonly known. Each arrangement has advantages and disadvantages well-known in the art; accordingly, the arrangement used will depend on the situation in which they are applied.

When a straight-line electrode array is used, various combinations of four electrodes are used to determine the resistivity at various points in the soil beneath the straight line. Thus, the resulting resistivity map is a vertical "slice" through the soil beneath the line. Repeating the process along parallel lines, as shown in FIG. 1b, allows the operator to map a three-dimensional subgrade soil volume.

In a second embodiment, one of the current electrodes 102 (shown in FIG. 1a) is inserted into the ground to a certain discrete depth. Voltage and current readings are then taken with this current electrode at this given depth. The electrode is then further impressed into the soil and readings are again taken. The process is repeated an indefinite number of times to arrive at resistivity data in three dimensions.

Figure 3:
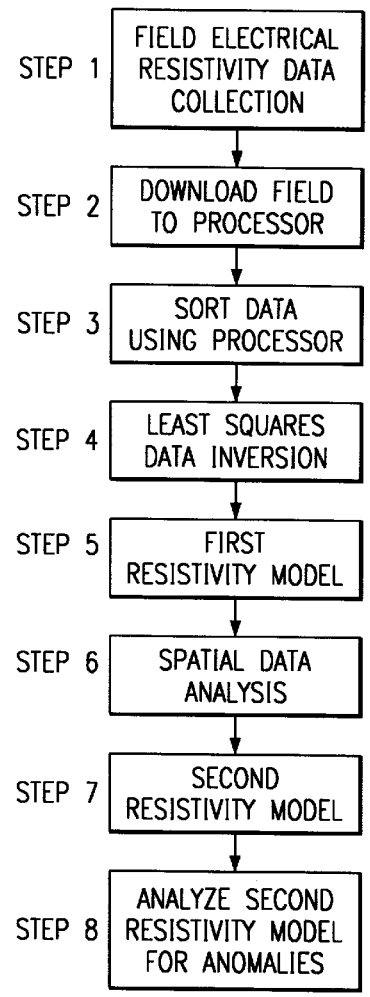
FIG. 3 is a flow chart illustrating a preferred embodiment of the disclosed method.

FIG. 3 is a flow chart depicting the steps involved in producing the subgrade resistivity map. Step 1 uses the equipment described above to perform field electrical resistivity data collection. Step 1 can also include varying the depth of the electrodes during data collection. Potential and current measurements from volt meter 120 and ammeter 112 are downloaded, using, for example, STINGDMP software, available from SAGA Geophysics, to processor 116 in Step 2. In a preferred embodiment, processor 116 is a desktop or laptop personal computer with a Pentium or equivalent microprocessor. The processor calculates electrical resistivity from the measured voltage and current according to the following equation:

$$R=(V/I)K,$$

where K (an electrode geometric constant)=the area of current flow÷the length of the current path.

The processor also calculates, based on the known locations of the current and voltage electrodes, the virtual data point locations corresponding to the calculated resistivity values. Thus, in Step 3, the processor, using SWIFTCNV software from SAGA Geophysics, or an equivalent, sorts the location and resistivity data into a number of discrete sets, each consisting of a spatial set of coordinates and a resistivity value at those coordinates.

Figure 4:
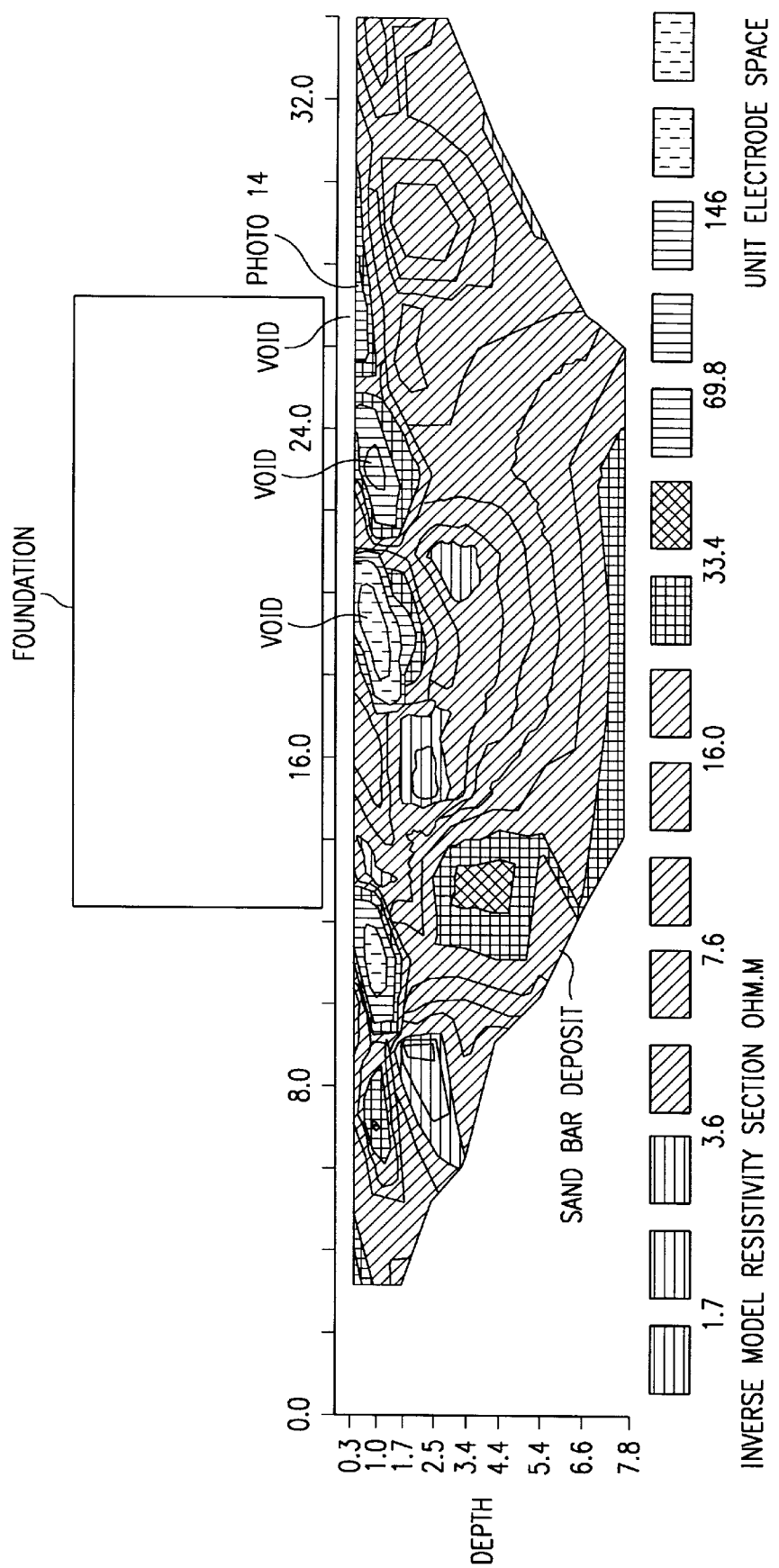
FIG. 4 is an example of a first resistivity model.

Next, in Step 4, the processor performs a least squares data inversion analysis on the location and resistivity data to create a first electrical resistivity model (Step 5). To perform this least squares data inversion, software such as RES2DINV by SAGA Geophysics may be used; however, a number of programs are available that can perform the least squares inversion and produce a two- or three-dimensional graphical output. This first electrical resistivity model minimizes the error of the field data. FIG. 4 is an example of a two-dimensional color graphical output of the least squares data inversion analysis of Step 5. FIG. 4 shows ill-defined voids and subsurface features such as a sandbar.

Figure 5:
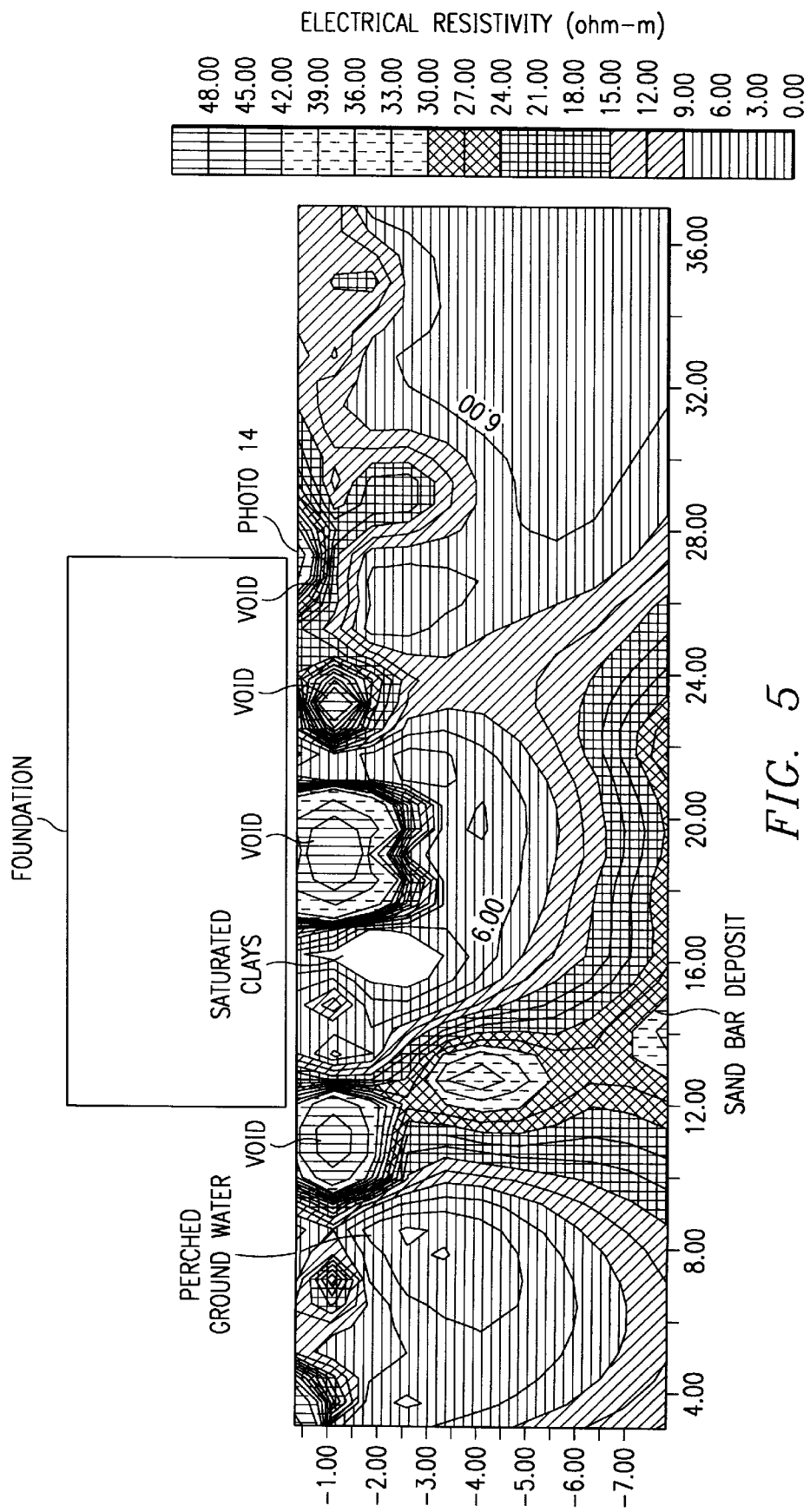
FIG. 5 is an example of a second resistivity model.

The next step, Step 6, is to perform a spatial data analysis using geostatistical methods, such as kriging. Step 6 produces a second electrical resistivity model (Step 7) that minimizes the error of the spatial variability of the first electrical resistivity model. SURFER is a typical commercially-available geostatistical analysis program; however, any geostatistical analysis program may be used. Again, the output is typically a two- or three-dimensional graphical representation of location and resistivity. FIG. 5 is an example of a two-dimensional color graphical output of the kriging analysis. FIG. 5 shows with much greater clarity voids saturated soil, ground water and sandbar deposits.

The final step—Step 8—is to analyze the second resistivity model for anomalies. Typically, a homogeneous subgrade soil volume will have a relatively uniform resistivity profile. However, certain anomalies—such as voids, vegetation, or fluids—will cause an increase or decrease in resistivity. For example, a void beneath a structure may show up as an area of particularly high electrical resistivity. On the other hand, a plumbing leak resulting in wet soil subjacent to the foundation may show up as an area with a particularly low resistivity compared with the remainder of the soil volume. Thus, by analyzing the electrical resistivity model the user can detect and locate resistivity spikes or depressions and correlate these discontinuities with certain soil anomalies. For example, in FIG. 5 high resistivity areas are marked in red; low resistivity areas are in various shades of blue. These areas indicate possible voids or wet soil, respectively.

Figure 6:
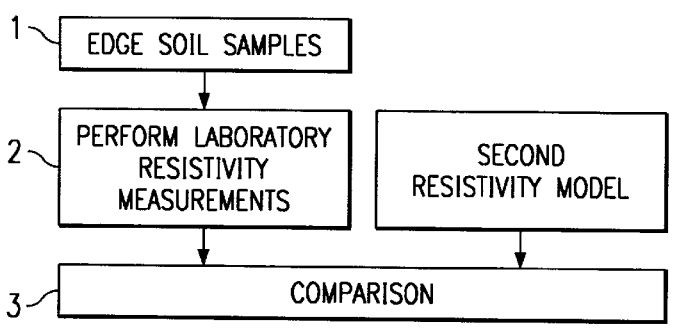
FIG. 6 is a flow chart illustrating a second preferred embodiment of the disclosed method.
Figure 7:
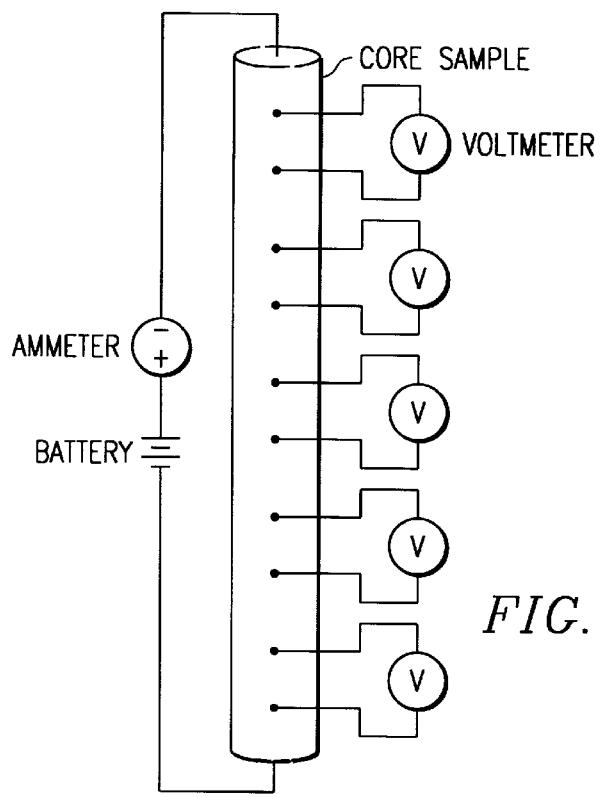
FIG. 7 is a schematic diagram illustrating laboratory core sample resistivity tests.

In another preferred embodiment of the method, represented by the flow chart shown in FIG. 6, one or more soil samples (124 in FIG. 1) are bored into the soil adjacent to the foundation 12 (FIG. 6, Step 1). In Step 2, laboratory resistivity tests are performed at a number of points along the length of the core samples to provide a baseline which is compared, in Step 3, to the second electrical resistivity model described above. FIG. 7 is a schematic illustrating the method of obtaining the laboratory resistivity measurements: a known DC current is applied to the sample by a battery and the resulting potential difference measured at a number of points along the sample's length by a voltmeter.

Figure 8:
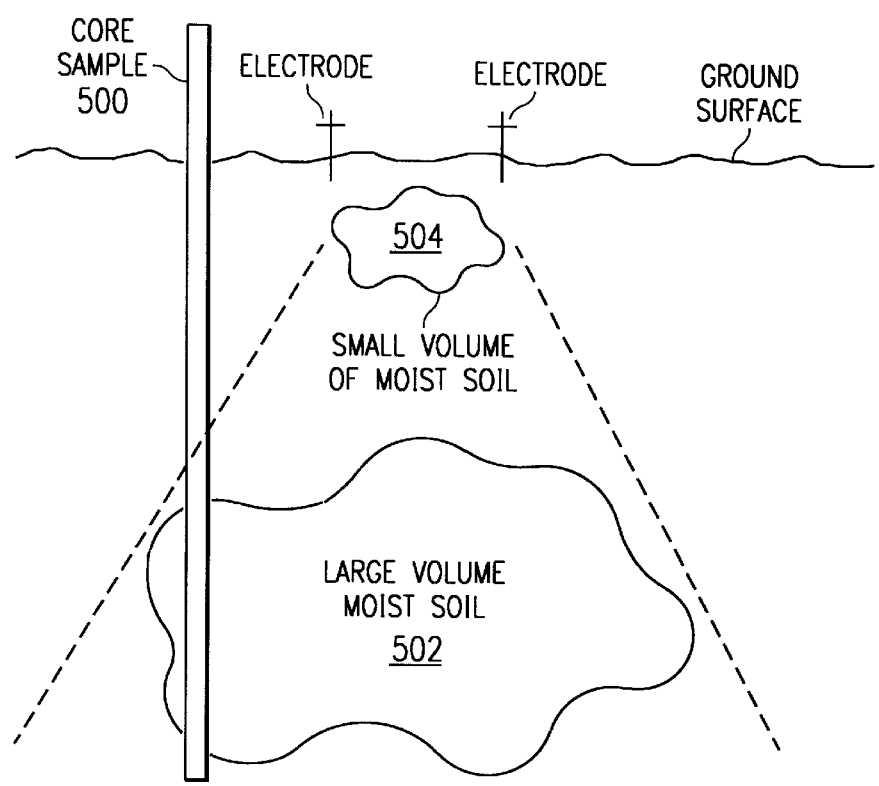
FIG. 8 illustrates the ambiguity known as "non-uniqueness".

Thus, in addition to noting anomalies or discontinuities in the second electrical resistivity model, this model can be compared with the baseline data provided by the measured core sample resistivity data to determine the presence and location of subgrade resistivity anomalies. Moreover, the actual resistivity data provided by the core samples allows the operator to minimize the problem of non-uniqueness, or the situation where a small anomaly located close to an electrode may appear identically to a large anomaly located at a distance from the electrode. For example, a resistivity model may indicate the presence of a large volume of water or moist soil at a large depth beneath the structure or foundation. However, the actual cause of this ambiguity may be a small volume of moist soil close to an electrode. FIG. 8 illustrates this ambiguity. Core sample 500, which can be, for example, 20 feet or more in depth, may resolve the ambiguity. For instance, as shown in FIG. 8, if the core sample indicates moist soil at a depth corresponding to the area of low resistivity indicated by the resistivity model, then the large volume of moist soil at a large depth (502) is confirmed and the small volume close to the surface (504) is excluded. On the other hand, if the core sample does not indicate the large volume of deep, moist soil, then that possibility is eliminated and the second possibility, the smaller volume of moist soil close to the surface, is confirmed. In other words, the core samples make the process more accurate by allowing the operator to throw out inaccurate data.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the spirit of the scope of the invention.

I claim:

1. A method for mapping an electrical resistivity distribution of a subsurface media comprising the steps of:
   (a) placing a plurality of electrodes through openings in the foundation of an existing structure;
   (b) applying a known current to pairs of said electrodes;
   (c) measuring a resulting potential difference across other pairs of said electrodes;
   (d) calculating a set of resistivity values based on said current and potential difference measurements;
   (e) deriving a map of said electrical resistivity values; and
   (f) analyzing said map to detect and locate anomalies in said subsurface media.

2. The method of claim 1 further comprising drilling a series of holes in a foundation of said structure to allow placement of said electrodes therethrough.

3. The method of claim 1 further comprising arranging said electrodes in a straight line.

4. The method of claim 1 further comprising arranging said electrodes in a plurality of parallel straight lines.

5. The method of claim 1 further comprising arranging said current injection electrode pairs and said potential measurement electrode pairs in a dipole-dipole array.

6. The method of claim 1 further comprising arranging said current injection electrode pairs and said potential measurement electrode pairs in a Schlumberger array.

7. The method of claim 1 further comprising arranging said current injection electrode pairs and said potential measurement electrode pairs in a Wenner array.

8. The method of claim 1 further comprising determining the spatial location of said resistivity values based on known locations of said current injection electrode pairs and said potential measurement electrode pairs.

9. The method of claim 8 further comprising performing a least squares inversion analysis on said location and resistivity data to create a first resistivity model.

10. The method of claim 9 further comprising performing a geostatistical analysis on said first resistivity model to create a second resistivity model.

11. The method of claim 10 wherein said geostatistical analysis comprising kriging.

12. The method of claim 1 further comprising:
   (a) obtaining one or more soil samples adjacent to said structure;
   (b) measuring resistivity at a plurality of locations within said soil samples to create a set of baseline resistivity values;
   (c) comparing said map to said baseline values to eliminate any ambiguities in said resistivity map.

13. The method of claim 10 wherein said second resistivity model comprising a two-dimensional graphical output.

14. The method of claim 10 wherein said second resistivity model comprising a three-dimensional graphical output.

15. A method of mapping an electrical resistivity distribution of a subsurface media comprising the steps of:
   a. obtaining at least one sample of said media;
   b. measuring a resistivity baseline of said sample;
   c. placing a plurality of electrodes within said media, wherein a portion of said plurality of said plurality of electrodes are placed within said media through openings in a foundation;
   d. applying a known current to pairs of said electrodes;
   e. measuring a resulting potential difference between other pairs of said electrodes;
   f. deriving resistivity values at different locations based on said current and said current and said potential measurements;
   g. deriving a map of said resistivity values; and
   h. comparing said map with said baseline resistivity measurements to identify soil anomalies.

16. The method of claim 15 further comprising obtaining a plurality of said samples.

17. The method of claim 16 further comprising taking said samples in a plan view array.

18. The method of claim 17 wherein said array is linear.

19. The method of claim 17 wherein said array is non-linear.

20. The method of claim 15 further comprising measuring resistivity at a plurality of depths within said samples.

21. The method of claim 15 further comprising drilling a plurality of holes through a foundation to allow insertion of said electrodes therethrough.

22. The method of claim 15 further comprising calculating a corresponding location for each said resistivity derivation based on a known location for each member of said current injection pair and said potential measurement pair.

23. The method of claim 22 further comprising performing a least squares inversion analysis of said location and resistivity data to produce a first resistivity model.

24. The method of claim 23 further comprising performing a geostatistical analysis on said first resistivity model to create a second resistivity model.

25. The method of claim 24 wherein said geostatistical analysis comprising kriging.

26. The method of claim 24 further comprising comparing said second resistivity model with said sample resistivity baseline to detect and locate resistivity anomalies in said media.

27. The method of claim 15 further comprising arranging said electrodes linearly.

28. The method of claim 15 further comprising arranging said electrodes nonlinearly.

29. The method of claim 15 further comprising arranging said current injection electrode pairs and said potential measurement electrode pairs in a Schlumberger array.

30. The method of claim 15 further comprising arranging said current injection electrode pairs and said potential measurement electrode pairs in a dipole-dipole array.

31. The method of claim 15 further comprising arranging said current injection electrode pairs and said potential measurement electrode pairs in a Wenner array.

32. The method of claim 24 wherein said second resistivity model comprising a two-dimensional graphical output.

33. The method of claim 24 wherein said second resistivity model comprising a three-dimensional graphical output.

34. An apparatus for mapping an electrical resistivity distribution of a subsurface media, comprising:
   (a) a plurality of electrodes inserted through openings in the foundation of an existing structure;
   (b) means for applying a known current to pairs of said electrodes;
   (c) means for measuring a resulting potential difference across other pairs of said electrodes; and
   (d) means for calculating a set of resistivity values based on said current and potential difference measurements.

35. An apparatus for mapping an electrical resistivity distribution of a subsurface media, comprising:
   (a) means for obtaining at least one sample of said media;
   (b) means for measuring a resistivity baseline of said sample with a plurality of electrodes within said media;
   (c) means for applying a known current to pairs of said electrodes;
   (d) means for measuring a potential difference between other pairs of said electrodes;
   (e) means for deriving resistivity values at different locations based on said current and said potential measurements; and
   (f) means for deriving a map of said resistivity values.

36. A method of mapping an electrical resistivity distribution of a subsurface media, comprising:
   (a) inserting at least three surface electrodes through openings in the foundation of an existing structure;
   (b) inserting a subsurface electrode into the ground to a given depth beneath the surface electrodes;
   (c) applying a known current to the subsurface electrode and on of the surface electrodes;
   (d) measuring the resulting potential difference across a pair of the surface electrodes;
   (e) changing the depth at which the subsurface electrode is placed;
   (f) calculating a set of resistivity values based on the current and potential difference measurements;
   (g) deriving a map of the electrical resistivity values; and
   (h) analyzing the map to determine and locate anomalies in the subsurface media.

37. The method of claim 36 further comprising drilling a series of holes in a foundation of said structure to allow placement of said surface and subsurface electrodes therethrough.

38. The method of claim 36 further comprising arranging said surface and subsurface electrodes in a straight line.

39. The method of claim 36 further comprising arranging said surface and subsurface electrodes in a plurality of parallel straight lines.

40. The method of claim 36 further comprising arranging said electrodes in a dipole-dipole array.

41. The method of claim 36 further comprising arranging said electrodes in a Schlumberger array.

42. The method of claim 36 further comprising arranging said electrodes in a Wenner array.

43. The method of claim 36 further comprising determining the spatial location of said resistivity values based on known locations of said electrodes.

44. The method of claim 36 further comprising performing a least squares inversion analysis on said location and resistivity data to create a first resistivity model.

45. The method of claim 36 further comprising performing a geostatistical analysis on said first resistivity model to create a second resistivity model.

46. The method of claim 36 wherein said geostatistical analysis comprising kriging.

47. The method of claim 36 further comprising:
   (a) obtaining one or more soil samples adjacent to said structure;
   (b) measuring resistivity at a plurality of locations within said soil samples to create a set of baseline resistivity values;
   (c) comparing said map to said baseline values to eliminate any ambiguities in said resistivity map.

48. The method of claim 36 wherein said second resistivity model comprising a two-dimensional graphical output.

49. The method of claim 36 wherein said second resistivity model comprising a three-dimensional graphical output.

* * * * *